(12) United States Patent
Loritz et al.

(10) Patent No.: US 8,707,691 B2
(45) Date of Patent: Apr. 29, 2014

(54) HYDROSTATIC DRIVE

(75) Inventors: Steffen Loritz, Ulm (DE); Hans Melief, Simpsonville, SC (US)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 13/107,092

(22) Filed: May 13, 2011

(65) Prior Publication Data
US 2011/0277459 A1 Nov. 17, 2011

(30) Foreign Application Priority Data

May 14, 2010 (DE) .......................... 10 2010 020 528

(51) Int. Cl.
*F16D 31/02* (2006.01)
(52) U.S. Cl.
USPC .............................................. 60/447; 60/464
(58) Field of Classification Search
USPC .................................... 60/443, 444, 447, 464
See application file for complete search history.

(56) References Cited

U.S. PATENT DOCUMENTS

| | | | |
|---|---|---|---|
| 5,875,630 A | 3/1999 | Walsh et al. | |
| 5,881,629 A * | 3/1999 | Gollner et al. | 91/505 |
| 6,167,702 B1 * | 1/2001 | Schniederjan | 60/444 |
| 6,179,570 B1 | 1/2001 | Smith | |
| 6,684,636 B2 | 2/2004 | Smith | |

* cited by examiner

*Primary Examiner* — Michael Leslie
(74) *Attorney, Agent, or Firm* — Maginot, Moore & Beck

(57) ABSTRACT

A hydrostatic drive, in particular a fan drive, with a variable displacement pump is configured to drive at least one hydraulic motor. The variable displacement pump is activated via a pressure regulating valve and a following directional valve predetermining the feed direction, via which valves the control spaces of an actuating cylinder can be acted upon with a control pressure difference. The variable displacement pump is prestressed into a basic position in which the feed volume flow is maximum.

10 Claims, 3 Drawing Sheets

HYDROSTATIC DRIVE

This application claims priority under 35 U.S.C. §119 to patent application no. DE 10 2010 020 528.1, filed May 14, 2010 in Germany, the disclosure of which is incorporated herein by reference in its entirety.

BACKGROUND

The disclosure relates to a hydrostatic drive, in particular a fan drive.

A coolant circuit of an engine, for example of an internal combustion engine, can be driven by means of a fan drive of this type.

U.S. Pat. No. 5,875,630 discloses a fan drive in which a hydraulic motor of the fan is driven via a variable displacement pump. The variable displacement pump, in its basic position, is set toward the maximum feed volume flow and can be adjusted toward minimizing the feed volume flow via single-edge control with a fixed throttle and an adjusting throttle. The disadvantage of this solution is that, on the one hand, a high outlay in terms of the adjustment of the variable displacement pump is required and, on the other hand, the fan can be actuated in only one direction.

U.S. Pat. No. 6,179,570 B1 discloses a similar fan drive in which the adjustment of the variable displacement pump toward a reduction in the feed volume can be adjusted via an electroproportionally adjustable pressure regulating valve (DRE), the control oil being picked off from the pressure medium volume flow to the hydraulic motor.

In this drive, too, only one direction of rotation of the hydraulic motor is provided. Another disadvantage is the internal control oil pick-off, since this is subject to comparatively high fluctuations.

U.S. Pat. No. 6,684,636 B2 discloses a generic hydrostatic drive with a variable displacement pump which is pivotable through zero and drives a hydraulic motor, the drive torque of which is reversible. The variable displacement pump is adjusted via an actuating cylinder which is prestressed toward the minimum feed volume flow. In a similar way to the prior art described above, the actuating cylinder is adjusted toward a higher feed volume flow via an electroproportionally adjustable pressure regulating valve with external control oil supply. If, then, the hydraulic motor is used for driving a fan, in the event of a power failure in the control electronics, the variable displacement pump pivots back to zero, and therefore, correspondingly, the fan is no longer driven, and then overheating of the coolant and consequently engine damage may occur.

By contrast, the object on which the disclosure is based is to provide a hydrostatic drive, in particular a fan drive, with improved operating reliability.

This object is achieved by means of a hydrostatic drive having the features set forth herein.

Advantageous developments of the disclosure are set forth herein.

SUMMARY

According to the disclosure, the hydrostatic drive, in particular a fan drive, has a variable displacement pump, via which at least one hydraulic motor can be driven and the feed volume of which is adjustable by means of an adjusting device. The latter has an actuating cylinder which is prestressed into a basic position and is adjustable by means of a control pressure set via a pressure regulating valve.

A directional valve is arranged in the control oil flow path between the pressure regulating valve and the actuating cylinder for the purpose of setting the feed direction. According to the disclosure, the variable displacement pump, in its basic position, is set to a maximum feed volume, so that, in the event of a failure of the signal for activating the electroproportionally adjustable pressure regulating valve, the pump, in its mechanically predetermined basic position, continues to feed pressure medium to the hydraulic motor, so that the functioning of the hydrostatic drive is maintained.

In a variant of the disclosure, an external control oil supply, preferably via a feed pump, is provided. This external control oil supply has the advantage that the maximum control oil pressure can be adapted optimally to the demand of the pressure regulating valve, and that a sufficient constant control oil pressure is always available.

In an exemplary embodiment of the disclosure, the actuating cylinder has a control space which is active toward the maximum feed volume flow and which is connected to the control oil supply and is therefore always acted upon by the maximum control oil pressure. In a further actuating cylinder control space which is active with the effect of reducing the feed volume flow, the control pressure set at the pressure regulating valve then acts, this pressure regulating valve having a rising characteristic curve, so that, with an increasing adjustment of the pressure regulating valve via the assigned proportional magnet, the control pressure in the last-mentioned control space also rises and therefore the actuating cylinder is reset according to an essentially linear characteristic curve with the effect of reducing the feed volume flow, until the control pressure in both control spaces is identical.

In an alternative solution, the actuating cylinder has a control space which is active toward an increase in the feed volume flow and in which the control pressure set at the pressure regulating valve acts, in this case the pressure regulating valve being designed with a falling characteristic curve, so that, with the increasing application of current to the proportional magnet, the feed volume flow decreases correspondingly.

In use as a fan drive, the said directional valve is set in a spring-prestressed basic position such that the fan acts with the effect of cooling the assigned coolant circuit.

In a highly compact exemplary embodiment, the pressure regulating valve and the directional valve are accommodated in a common valve casing, the axes preferably running parallel.

The set-up of the hydrostatic drive is especially simple when it is routed as a closed circuit in which the run-off of the hydraulic motor is linked to the low-pressure connection of the variable displacement pump.

In an exemplary embodiment of the disclosure, a pressure cut-off valve is provided, via which, when a maximum pressure in the run-in to or the run-off from the hydraulic motor is overshot, the pressure of the control oil supply is lowered with the effect of reducing the feed flow, so that the variable displacement pump pivots back.

The pressure cut-off valve may have a selector valve, via which the higher of the pressures in the run-in and in the run-off is switched through and acts in the opening direction upon a pressure valve which, when a preset maximum pressure is overshot, opens a connection of pressure medium to the tank so that the control oil pressure falls.

A nozzle may be provided upstream of this pressure cut-off valve, which nozzle, when the flow passes through it, causes a pressure drop.

BRIEF DESCRIPTION OF THE DRAWINGS

A preferred exemplary embodiment of the disclosure is explained in more detail below by means of diagrammatic drawings in which.

DETAILED DESCRIPTION

Figure 1:
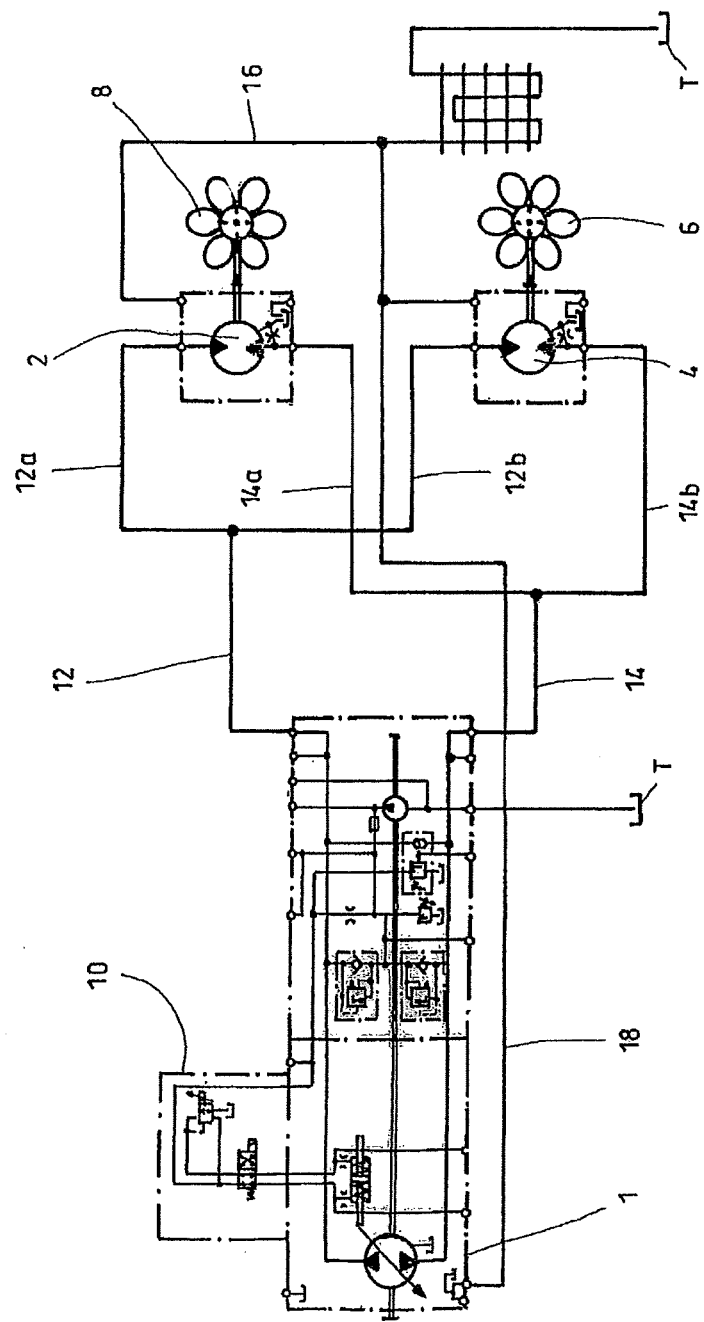
FIG. 1 shows a circuit diagram of a hydrostatic fan drive.

FIG. 1 shows a circuit diagram of a hydraulic fan drive 1, in which two fan motors 2, 4 designed as hydraulic motors are driven via a variable displacement pump unit 1 and drive in each case a fan wheel 6, 8, via which a coolant circuit, not illustrated, for example belonging to a vehicle is cooled. The pump unit 1 indicated by dashed lines in FIG. 1 is activated via an activation apparatus, referred to below as a regulating valve arrangement 10, in order to set the feed volume flow and therefore the rotational speed of the fan motors 2, 4.

The pump unit 1 has two working connections A, B to which supply lines of the hydraulic motors 2, 4 are connected. To simplify the following statements, it is assumed that the pump unit 1 feeds pressure medium to the hydraulic motors 2 via the connection B, and that expanded pressure medium flows back to the pump unit 1 via the working connection A. Accordingly, the line connected to the working connection B is designated as the run-in line 12 which branches toward the two fan motors 2, 4 into branch lines 12a, 12b which lead to the respective connections A of the fan motors 2, 4. The run-in-side connections B of the two series-connected fan motors 2, 4 are then connected correspondingly to the working connection A via two run-off lines 14a, 14b which are combined into a common run-off line 14. Possible leakages of the hydraulic motors 2, 4 are discharged via connections T2. The connection T, illustrated further in FIG. 1, of the fan motors 2, 4 is likewise a leakage connection, to which a leakage line 16 leading to the tank T is connected. A further leakage line 18 also issues into the leakage line 16 and is connected to connections T1, T2 of the pump unit 1, so that leakage can also be recirculated here.

Suitable devices for cooling the pressure medium may also be provided in these leakage or tank lines 16, 18, so that part of the pressure medium can be branched off, filtered and cooled and is then subsequently fed again into the closed circuit described above. This is also explained in more detail below.

Details of the pump unit 1 and of the regulating valve unit 10 are explained with reference to FIG. 2.

The pump unit 1 has a variable displacement pump 20 which is pivotable through zero and is connected via a delivery line (in the sense of the direction of flow explained above) 22 to the connection B and via a suction line 24 to the other working connection A. In the exemplary embodiment illustrated, the variable displacement pump 20 is designed as an axial piston pump, the pivot angle of which is adjustable via an actuating cylinder 26. The latter is prestressed via the centering spring arrangement 28 into a basic position in which the feed volume flow of the variable displacement pump 20 is maximum. The actuating cylinder 26 has two control spaces 30, 32, of which the control space 30 active toward an increase in the feed volume flow is connected to the regulating valve unit 10 via a control line 34. The other control space 32 active toward a reduction in the feed volume flow is likewise connected via a further control line 36 to the regulating valve unit 10.

The latter has a 2/2-way valve 38 prestressed via a spring into a basic position (a) in which the first-mentioned control line 34 is connected via a control duct 40 to a control oil connection S of the regulating valve unit 10. This control oil connection S is itself connected via a feed or control oil supply duct 42 to the delivery connection of a feed pump 44 which lies on the same drive shaft 46 as the variable displacement pump 20. This feed pump may be connected to the vehicle's engine, for example, via a clutch. A nozzle 48, the function of which is dealt with later, is provided in the control oil supply duct 42.

A suction connection of the feed pump 44 is connected to the above-described tank T via a tank duct 50 and a connection S.

Figure 2:
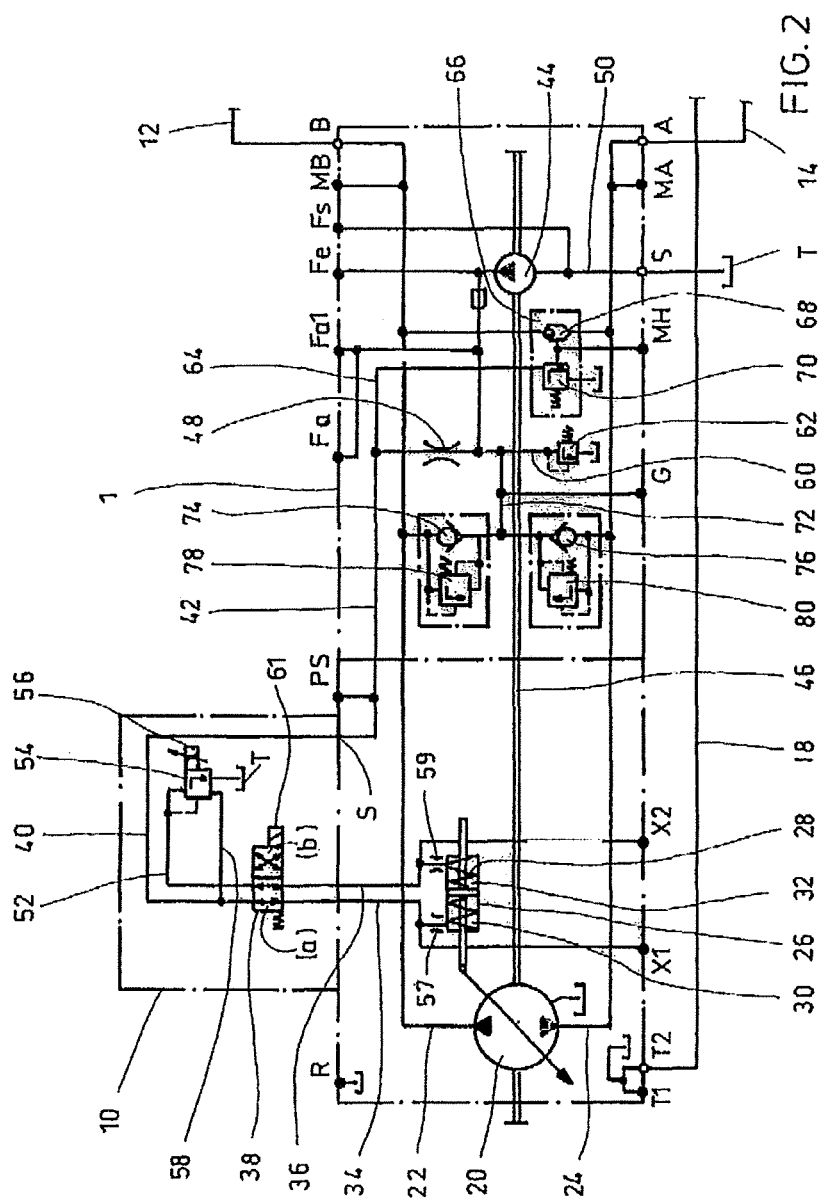
FIG. 2 shows an enlarged illustration of the pump-side region of the fan drive from FIG. 1.

The control line 36 on the right in FIG. 2 is connected, in the switching position (a) of the directional valve 38, to a duct 52 which leads to the outlet of a pressure regulating valve 54. The latter is acted upon in the closing direction by the pressure in the duct 52 and in the opposite direction by the force of a proportional magnet 56. In the illustrated basic position of the pressure regulating valve 54, a further outlet is connected to the tank T. An inlet of the pressure regulating valve 54 is connected via a control duct portion 58 to the control duct 40, so that the maximum control oil supply pressure provided by the feed pump 44 prevails at this inlet. The outlet, in pressure medium connection to the duct 52, of the pressure regulating valve 54 is shut off with respect to the control duct portion 58 and connected to the tank T in the basic position illustrated. Accordingly, in this basic position of the pressure regulating valve 54, the control space 32 is connected to the tank T, while the control oil supply pressure prevails in the other control space 30. A throttle 57, 59 is arranged in each case in the two control lines 34, 36.

By current being applied to the proportional magnet 56, the connection of the duct 52 to the tank T is closed and the connection between the duct portion 58 and the duct 52 is opened, so that, in the latter, a control pressure active toward the reduction in the feed volume flow is set according to the deflection of the proportional magnet. With an increasing deflection of the proportional magnet 56, therefore, the control pressure in the control space 32 is increased and, correspondingly, the pivot angle of the variable displacement pump 20 is reduced.

The directional valve 38 has a switching magnet 61, by means of which it can be adjusted into a switching position (b) in which the control space 30 is then connected to the duct 52 and the control space 32 to the control duct 40. By this directional valve 38 being changed over, the adjustment direction of the variable displacement pump 20 can therefore be varied, so that the feed direction is also reversed correspondingly.

According to the above statements, the pressure regulating valve 54 is designed with a falling characteristic curve, since, when the proportional magnet is de-energized, the control pressure in the duct 52 is minimal and then increases with an increasing application of current.

Upstream of the nozzle 48, a limiting duct 60 branches off from the control oil supply duct 42 and has arranged in it, for maximum pressure limitation, a control oil pressure limiting valve 62 which opens toward the tank T when the control oil maximum pressure is overshot.

Downstream of the nozzle 48, a switch-off duct 64 branches off from the control oil supply duct 42 and has arranged in it a pressure cut-off valve unit. The latter has a shuttle or selector valve 68, the inlets of which are connected respectively to the delivery line 22 and to the suction line 24, so that the higher of these pressures, usually the pressure in the run-in, prevails at the outlet of the selector valve 68. This pressure acts upon a pressure cut-off valve 70 toward a connection of the pressure medium to the tank T. In the opposite direction, that is to say in the closing direction, the pressure cut-off valve 70 is acted upon by the force of an adjustable spring. When the cut-off pressure is overshot, the pressure cut-off valve 70 opens toward the tank, so that a pressure drop occurs via the nozzle 48 and, as a result of the falling control oil pressure and a corresponding lowering of pressure in the control space 30, the variable displacement pump 20 is pivoted back until the resultant pressure in the run-in falls below the cut-off pressure. Such pressure cut-off or pressure switchoff valves are known from the prior art, for example from the data sheet RD26404/04.09 of Bosch Rexroth GmbH, and therefore further explanations are unnecessary.

In the control oil flow path between the nozzle 48 and the control oil pressure limiting valve 62, a feed duct 72 branches off and branches into two feed duct portions, of which one is connected to the delivery line 22 and the other to the suction line 24. A nonreturn valve 74 opening toward the delivery line 22 is arranged in the delivery line-side branch duct and a nonreturn valve 76 opening toward the suction line 24 is arranged in the other branch duct, so that, when the pressure in the respective line 22, 24 falls, pressure medium can be fed into the respective line via the feed pump 44. Each of the two nonreturn valves 74, 76 has connected to it in parallel a pressure limiting valve 78, 80, via which the pressure in the line 22 or 24 assigned in each case is limited to a maximum value and which, when the assigned nonreturn valve 74, 76 is bypassed, then opens a pressure medium flow path to the other line 24, 22 in each case, the corresponding downstream nonreturn valve 76, 74 then opening, so that, when the preset maximum pressure is overshot, the pressure medium can flow out from the high-pressure side to the low-pressure side of the pressure medium circuit.

The other connections of the pump unit 1 according to FIG. 2 merely serve for picking off pressure medium or control oil streams, a detailed explanation being unnecessary.

Figure 3:
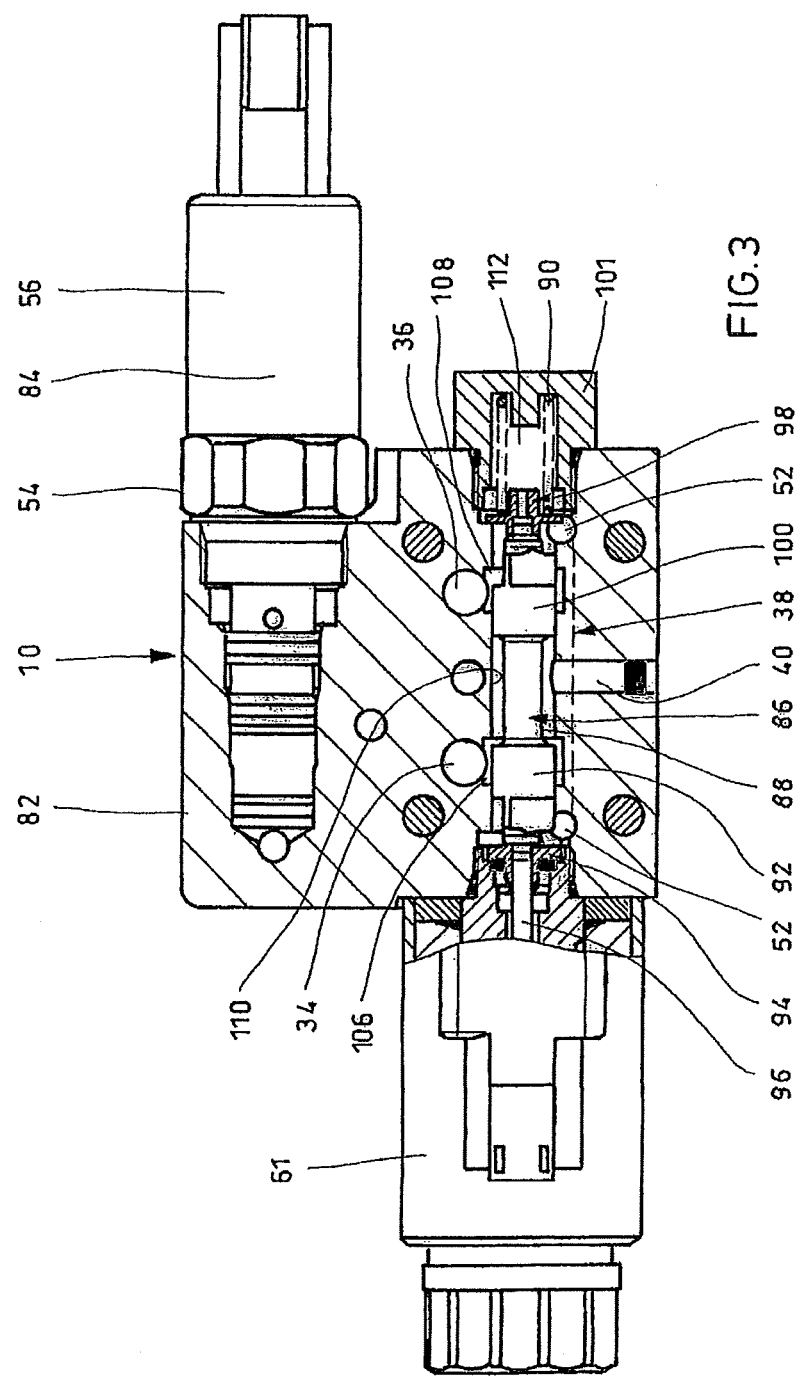
FIG. 3 shows a physical embodiment of a pressure reducing valve and directional valve of the fan drive according to FIG. 1.

FIG. 3 shows a sectional illustration of an actual regulating valve unit. This has a valve casing 82 which is placed onto the casing of the pump unit 1 and into which is screwed the pressure regulating valve 54 which is designed as a built-in cartridge and the proportional magnet 56 of which projects with its connections out of the valve casing 82. The directional valve 38 is accommodated, parallel to the valve axis 84 of the pressure regulating valve 54, in the valve casing 82, the switching magnet 61 of the said directional valve being attached to that end face of the valve casing 82 which lies opposite the proportional magnet 56.

The directional valve 38 has a valve slide 86 with an approximately central control groove 88 prestressed via a spring 90 into a basic position in which an end collar 92 delimiting the control groove 88 is prestressed against a disk 94 which is integrated into the switching magnet 61 and is pierced by a tappet 96 of the switching magnet 61. The spring 90 acts via a spring plate 98 on another end collar 100 of the valve slide 86 and is supported on a spring cap 101 delimiting a spring casing 112.

The end faces of the two end collars 92, 100 are acted upon by the control oil pressure at the outlet of the pressure regulating valve 54, the said control oil pressure being picked off via the duct 52 (see FIG. 2 and the dashed line in FIG. 3), of which two cross-sectional regions can be seen in the section according to FIG. 3.

As indicated in FIG. 3, the control lines 34 and 36 connected to the control spaces 30 and 32 respectively issue in each case into an annular space 106, 108 of a valve bore 110 receiving the valve slide 86. The control duct 40 carrying the maximum control oil pressure/feed pressure issues in that region of the valve bore 110 which is delimited by the control groove 88. In the spring-prestressed basic position illustrated, the annular end face of the end collar 92 opens the pressure medium connection between the control duct 40, the annular groove delimited by the control groove 88, the annular space 106 and the control line 34, so that, as already explained with reference to FIG. 2, the feed pressure prevails in the control space 30 of the actuating cylinder 26. At the same time, the pressure medium connection between the duct 52 and the other control line 36 is opened via the rear side of the other end collar 100. Accordingly, the control pressure set at the pressure regulating valve 54 is then routed via the control duct 52, the spring space 112 of the spring 90, the annular space 108 and the control line 36 to the control space 32, active toward the reduction in the pivot angle, of the actuating cylinder 26. The pressure medium connection of the duct 52 to the control duct 34 and of the duct 40 to the control duct 36 is in this case shut off by the respective end collar 92, 100 (switching position (a)).

When current is applied to the switching magnet 61, the control line 36 is correspondingly acted upon by the feed pressure and the control line 34 by the control pressure set via the pressure regulating valve 54 (switching position (b)), so that, when the directional valve is switched through, the feed direction of the variable displacement pump 20 is reversed. This operating mode is set, for example, when the radiator is to be blown free in order to remove dirt which has previously been sucked in.

The tank connection of the pressure regulating valve 54 cannot be seen in the sectional illustration according to FIG. 3.

The above-described exemplary embodiment relates to a fan drive, but the hydrostatic drive explained can also be used for driving other hydraulic consumers. Basically, the fan motors 2, 4 themselves may be designed, in turn, to be adjustable. Other types of pump can also be used.

A hydrostatic drive, in particular a fan drive, with a variable displacement pump, via which at least one hydraulic motor can be driven, is disclosed. The variable displacement pump is activated via a pressure regulating valve and a following directional valve predetermining the feed direction, via which valves the control spaces of an actuating cylinder can be acted upon with a control pressure difference. According to the disclosure, the variable displacement pump is prestressed into a basic position in which the feed volume flow is maximum.

What is claimed is:

1. A hydrostatic drive having a variable displacement pump which is pivotable through zero and which is configured to drive at least one hydraulic motor and a feed volume flow of which is adjustable by means of an adjusting device having an actuating cylinder which is prestressed into a basic position and is adjustable by means of a control pressure set via a pressure regulating valve, in order to vary the preset feed volume flow, a directional valve that is arranged between the pressure regulating valve and the actuating cylinder for the purpose of setting the feed direction, wherein the variable displacement pump, in the basic position, is set to a maximum feed volume flow.

2. The hydrostatic drive according to claim 1, further comprising an external control oil supply which takes place via a feed pump.

3. The hydrostatic drive according to claim 2, wherein the actuating cylinder has a control space which is active toward the maximum feed volume flow and which is connected to the control oil supply and has a control space which is active with the effect of reducing the feed volume flow and in which the control pressure set at the pressure regulating valve acts, the pressure regulating valve having a rising characteristic curve.

4. The hydrostatic drive according to claim 2, wherein the actuating cylinder has a control space which is active toward an increase in the feed volume flow and in which the control pressure set at the pressure regulating valve is active, the pressure regulating valve having a falling characteristic curve.

5. The hydrostatic drive according to claim 1, wherein the directional valve is prestressed into a basic position in which a fan wheel driven by the hydraulic motors is active with the effect of cooling.

6. The hydrostatic drive according to claim 1, wherein the pressure regulating valve and the directional valve are located in a common valve casing.

7. The hydrostatic drive according to claim 1, wherein the variable displacement pump and a hydraulic motor are arranged in a closed circuit.

8. The hydrostatic drive according to claim 1, further comprising a pressure cut-off valve, via which, when a maximum pressure in the run-in to or in the run-off from the hydraulic motor is overshot, the pressure of the control oil supply is reduced with the effect of reducing the feed volume flow.

9. The hydrostatic drive according to claim 8, wherein the pressure cut-off valve is assigned a selector valve which switches through the higher of the pressures in the run-in or in the run-off and which acts upon the pressure cut-off valve in the opening direction, so that, when the maximum pressure is overshot, a connection of pressure medium to the tank can be opened.

10. The hydrostatic drive according to claim 9, further comprising a nozzle positioned upstream of the pressure cut-off valve.

\* \* \* \* \*